Patented Aug. 14, 1945

2,382,886

UNITED STATES PATENT OFFICE 2,382,886

TREATMENT OF LIME-CONTAINING RAW MATERIALS

Harley C. Lee and Elizabeth K. Lee, Columbus, and Robert A. Schoenlaub, Tiffin, Ohio, assignors to Basic Refractories, Inc., Cleveland, Ohio, a corporation of Ohio No Drawing. Application February 4, 1943, Serial No. 474,708

8 Claims. (Cl. 23—186)

This invention relates to the treatment of raw materials containing lime and magnesia, and more particularly the extracting of magnesia from dolomite or magnesian limestones, calcareous magnesites, etc. It has been proposed to extract the magnesia from dolomite by various methods, such as reacting burned dolomite with brines containing magnesium chloride, and precipitating magnesium hydroxide and forming calcium chloride; or by hydrating burned dolomite and treating with carbon dioxide to form insoluble calcium carbonate and soluble magnesium bicarbonate; or by leaching burned dolomite with water or sugar solution to remove the more soluble calcium hydroxide and leave behind the insoluble magnesium hydroxide contaminated with some calcium hydroxide. Of such methods, reaction on dolomite with brines has been best known, as magnesia could be obtained from both dolomite and brines, and by-products such as salt and bromine have also been possible. For the most part however, the products of all these methods are too expensive to compete with natural magnesites or brucites as a source of refractory magnesia. Intrinsic difficulties in pumping, settling and filtering large quantities of dilute suspensions and solutions seem to preclude extensive use of any chemical method for the extraction from dolomite of a magnesia product at a cost low enough for refractory purposes. In accordance with the present invention magnesia suitable for refractory usages can be obtained from dolomite and magnesium limestones, and with the practical operating advantages that small volumes of concentrated suspensions are handled, in contrast to the dilute suspensions and solutions of the afore-noted chemical processes, and furthermore the methods of separation are physical and correspondingly cheaper than the common chemical methods. Furthermore, as a by-product there is obtained a hydrated lime of desirable chemical quality. Other objects and advantages will appear from the following description.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In general, the present process involves the calcining of dolomite, magnesium limestones, calcareous magnesites, etc., all of which for conciseness are hereinafter referred to as "dolomite," and then growing of discrete calcium hydroxide crystals, and finally separating these particles from the magnesia sludge. For most favorable operation it is desirable that the dolomite be calcined at a high temperature. A temperature of at least 2800° F., and preferably 3000° F. is satisfactory. It is important that the calcining temperature be as high as possible. This seems partially to segregate the lime from the magnesia and render the final magnesia sludge of higher grade. Burning agents such as compounds of boron may be used. Such agents in general seem to react preferentially with CaO over MgO in the calcining operation, and subsequently to delay the hydration of the CaO, with the consequent formation of large $Ca(OH)_2$ crystals but in general such additions increase grinding and batch costs. The material may be sized as desired. For the best efficiency in calcining, the dolomite should be crushed moderately fine and uniform in size, so that the particles will be uniformly burned. The calcining may be performed in any suitable kiln; for example a rotary kiln has been found to give effective results.

After calcining, the material is preferably ground to a fine size. The calcine may be ground in water and hydrated simultaneously, the hydration materially aiding comminution, thereby reducing cost. The slurry so formed may be as concentrated as can conveniently be handled; and this is usually around 25 parts of calcined dolomite to 75 parts of water. Calcium chloride is dissolved in the water in amount of generally around 5 per cent, but this may be somewhat less, or considerably more. The amount of calcium chloride affects the character of crystallization of the hydroxides. If no calcium chloride is provided, the crystals of calcium hydroxide which are ultimately obtained in the process are extremely thin and are variable in size and not well adapted to separation. With a concentration around 5 per cent $CaCl_2$ in the solution, the calcium hydroxide crystals ultimately obtained are regular and uniformly hexagonal and are capable of separation by classification. The crystals may be grown and separation effected with concentrations of up to about 15 per cent $CaCl_2$, but the calcium hydroxide obtained from the more concentrated $CaCl_2$ solutions is more contaminated with magnesia than at lower concentrations of chloride. Five to ten per cent of calcium chloride in general gives the most desirable separation. The ground calcined dolomite should be of quite fine size, as for example 95 per cent minus 325 mesh. Where using a ball mill, the final suspension of the slurry coming from the ball mill is usually hot from grinding and from hydration, which is desirable. Temperature has an important bearing on the attainment of separable crystals. While calcium hydroxide crystals can be grown at room temperature, the procedure is too slow, and a higher temperature, as for instance around 175° F. is preferable. Temperatures above 175° F. may be used, but the cost of heating and handling is increased.

The slurry is next pumped to agitators or tanks on the order of blunging tanks as known in the ceramic industry, and the material is blunged for an extended period, as two or three days, and at an elevated temperature, preferably around 175° F. A plurality of tanks, charged and emptied in rotation, may be used or the general process may be carried on in a continuous manner. During the blunging, calcium hydroxide crystals grow preferentially, and attain considerable size, such as for instance 150 microns in diameter, whereas the magnesia may be considerably less, as for instance 44 microns. The time of blunging affects both the cost of operation and the quality of the product. Separation to some degree can be attained with only one day's blunging; thereafter the speed of crystal growth drops off rapidly. Longer periods of agitation improve the quality of the product, but also increase the cost; shorter periods conversely decrease both the cost and the quality. Three days' blunging at a temperature of about 175° F. is in general a good compromise. The slurry may then be filterable by ordinary continuous filters, or may be dewatered otherwise if it is desired to reclaim a large portion of the chloride solution for recycling. The separated solids may then be run through a hydraulic classifier, which will separate the relatively coarse crystals of calcium hydroxide from the sludge which consists of magnesium hydroxide and small crystals of calcium hydroxide. This magnesia sludge can be further purified by flotation or by reaction with brine in simplified chloride cycle.

Hydraulic separation of the coarse calcium hydroxide and the fine magnesia sludge is comparatively cheap and easy to make. A combination rake-and-bowl type of classifier is well adapted for such separation. Alternatively the calcium hydroxide crystals may be classified from the mixed hydroxides in the original slurry by using excess solution or water in accordance with accepted classification practice. The fine magnesia sludge may then be treated for further purification, as by flotation, if desired.

As an example: Dolomite containing approximately 21 per cent MgO and 30 per cent CaO is crushed to minus 10 mesh, the minus 50 mesh material removed, and the minus 10 plus 50 mesh fraction calcined at 3000° to 3100° F. in a rotary kiln. The calcined material is mixed with a 5 per cent CaCl₂ solution in the ratio of 25 per cent of the material to 75 per cent of the solution. The mixture is ground to minus 325 mesh in a ball mill. The hot slurry obtained from this grinding is blunged at a temperature of around 175° F. for three days, the calcium chloride solution is separated from the hydroxides by thickening followed by filtration. The hydroxides are re-pulped with water and hydraulically separated by a combination rake-and-bowl classifier into plus 325 mesh and minus 325 mesh fractions. The plus 325 mesh fraction consists of calcium hydroxide analyzing about 69 per cent CaO and 2 per cent MgO, advantageously utilizable as chemical hydrated lime. The minus 325 mesh fraction consists of a magnesia sludge analyzing about 50 per cent MgO and 14 per cent CaO. The magnesia sludge can be admixed with iron oxide, silica, etc., and be calcined in a rotary kiln to a magnesia clinker which can be used for refractory purposes.

Other modes of applying the principle of the invention may be employed, change being made as regards the details described, provided the features stated in any of the following claims, or the equivalent of such, be employed.

We therefore particularly point out and distinctly claim as our invention:

1. A process of the character described, which comprises calcining dolomite at a temperature at least 2800° F., grinding the calcined material to about 325 mesh, subjecting a slurry thereof containing calcium chloride in amount from a few per cent to about fifteen per cent to a temperature of about 175° F. for about three days to allow formation of mechanically separable calcium hydroxide crystals, then mechanically separating the crystals of calcium hydroxide from the magnesium hydroxide.

2. A process of the character described, which comprises calcining dolomite at high temperature, finely grinding the calcined material, subjecting a slurry thereof containing calcium chloride in amount from a few per cent to about fifteen per cent to a temperature of about 175° F. for at least one day to allow formation of mechanically separable calcium hydroxide crystals, then mechanically separating the crystalline calcium hydroxide fraction from the magnesium hydroxide residue.

3. A process of the character described, which comprises calcining dolomite at high temperature, finely grinding the calcined material, subjecting a slurry thereof containing calcium chloride in amount from a few per cent to about fifteen per cent to elevated temperature for at least one day to allow formation of mechanically separable calcium hydroxide crystals, then mechanically separating the crystals of calcium hydroxide from the finer sludge including magnesium hydroxide.

4. A process of the character described, which comprises calcining dolomite at high temperature, finely grinding the calcined material and in a slurry thereof and in the presence of calcium chloride in amount from a few per cent to about fifteen per cent allowing calcium hydroxide crystal growth to proceed at elevated temperature, then classifying and mechanically separating the crystals of calcium hydroxide from magnesium hydroxide, and subjecting fine sludge to further flotation-separation.

5. A process of the character described, which comprises calcining dolomite at high temperature, finely grinding the calcined material and in a slurry thereof and in the presence of calcium chloride in amount from a few per cent to about fifteen per cent allowing calcium hydroxide crystal growth to proceed at elevated temperature, and finally mechanically separating the crystals of calcium hydroxide and magnesium hydroxide by classification.

6. A process of the character described, which comprises calcining dolomite in the presence of a burning agent at high temperature and in a slurry of the calcined product allowing calcium hydroxide crystal growth to proceed at elevated temperatures in the presence of calcium chloride in amount from a few per cent to about fifteen per cent for at least one day, and mechanically separating the crystals of calcium hydroxide from the finer sludge including magnesium hydroxide.

7. A process of the character described, which comprises calcining dolomite at high temperature, finely grinding the calcined material, providing in a slurry thereof and in the presence of calcium chloride in amount from a few per cent to about fifteen per cent conditions selectively favoring crystal growth of calcium hydroxide to mechanically separable size, and mechanically separating out such crystals.

8. A process of the character described, which comprises calcining dolomite with a burning agent at high temperature, providing in a slurry of the calcined material containing calcium chloride in amount from a few per cent to about fifteen per cent conditions selectively favoring crystal growth of calcium hydroxide to mechanically separable size, and mechanically separating out such crystals.

HARLEY C. LEE.
ELIZABETH K. LEE.
ROBERT A. SCHOENLAUB